(12) United States Patent
Yang et al.

(10) Patent No.: US 11,934,975 B2
(45) Date of Patent: *Mar. 19, 2024

(54) RESOURCE PROCESSING METHOD AND APPARATUS

(71) Applicant: ADVANCED NEW TECHNOLOGIES CO., LTD., George Town (KY)

(72) Inventors: Zhirong Yang, Hangzhou (CN); Xin Dai, Hangzhou (CN); Hai Ma, Hangzhou (CN); Fangcheng Mei, Hangzhou (CN); Mei Liu, Hangzhou (CN); Qian Wan, Hangzhou (CN); Qiaoyong Liu, Hangzhou (CN); Hualiang Dong, Hangzhou (CN); Zhixu Wang, Hangzhou (CN); Weiwei Ding, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,015

(22) Filed: Mar. 17, 2022

(65) Prior Publication Data

US 2022/0207440 A1    Jun. 30, 2022

Related U.S. Application Data

(63) Continuation of application No. 16/446,534, filed on Jun. 19, 2019, now Pat. No. 11,288,604, which is a
(Continued)

(30) Foreign Application Priority Data

Dec. 23, 2016 (CN) .......................... 201611207781.7

(51) Int. Cl.
*G06F 9/50* (2006.01)
*G06Q 10/0631* (2023.01)
(Continued)

(52) U.S. Cl.
CPC ....... *G06Q 10/0631* (2013.01); *G06F 9/5027* (2013.01); *G06Q 20/0855* (2013.01);
(Continued)

(58) Field of Classification Search
CPC ........... G06Q 10/0631; G06Q 20/0855; G06Q 30/04; H04L 67/53; H04L 67/55; G06F 9/5027
See application file for complete search history.

(56) References Cited

U.S. PATENT DOCUMENTS 7,721,292 B2 * 5/2010 Frasier .................... G06F 9/505
                                                          718/104
8,495,646 B2 * 7/2013 Uchida ............... G06F 11/3409
                                                          718/104
(Continued)

FOREIGN PATENT DOCUMENTS

CA    2838406 A1    4/2015
CN    102483825 A    5/2012
(Continued)

OTHER PUBLICATIONS

Communication pursuant to Article 94(3) EPC for European Application No. 17885221.6 dated Apr. 28, 2022.
(Continued)

*Primary Examiner* — Chris Parry
*Assistant Examiner* — Hassan A Khan

(57) ABSTRACT

A resource processing method and apparatus. The method is achieved by a computer configured to execute the following steps: generating a resource allocation chart based on a resource allocation request; processing the resource alloca-
(Continued)

tion chart and generating an access entrance of the resource allocation chart; opening the access entrance to enable at least one third party resource supplier to respond to the resource allocation request via the access entrance. The method further comprises: when the resources are not available or not suitable for allocation, receiving a resource allocation chart, wherein the resource allocation chart is based on the resource allocation request; generating an access entrance of the resource allocation chart; opening the access entrance to at least one third party resource supplier; and receiving the allocated resources from the at least one third party resource supplier by responding to the resource allocation request through the access entrance.

16 Claims, 3 Drawing Sheets

Related U.S. Application Data continuation of application No. PCT/CN2017/116529, filed on Dec. 15, 2017.

(51) Int. Cl.
G06Q 20/08 (2012.01)
H04L 67/53 (2022.01)
H04L 67/55 (2022.01)
G06Q 30/04 (2012.01)

(52) U.S. Cl.
CPC .............. H04L 67/53 (2022.05); H04L 67/55 (2022.05); G06Q 30/04 (2013.01)

(56) References Cited

U.S. PATENT DOCUMENTS

| | | | |
|---|---|---|---|
| 9,466,051 B1* | 10/2016 | Roth | G06F 21/6218 |
| 2004/0010592 A1* | 1/2004 | Carver | H04L 47/805 709/226 |
| 2004/0024687 A1* | 2/2004 | Delenda | G06Q 30/0601 705/37 |
| 2005/0044205 A1* | 2/2005 | Sankaranarayan | G06F 9/526 709/223 |
| 2006/0136761 A1* | 6/2006 | Frasier | G06F 9/505 713/320 |
| 2007/0276688 A1* | 11/2007 | Sun | G06Q 30/02 705/347 |
| 2008/0080396 A1* | 4/2008 | Meijer | H04L 12/66 370/254 |
| 2009/0055693 A1* | 2/2009 | Budko | G06F 9/45558 718/1 |
| 2009/0171759 A1* | 7/2009 | McGeehan | G06Q 40/00 705/35 |
| 2009/0183168 A1* | 7/2009 | Uchida | G06F 9/5027 718/104 |
| 2009/0276771 A1* | 11/2009 | Nickolov | G06Q 30/04 718/1 |
| 2010/0153955 A1* | 6/2010 | Sirota | G06F 9/485 718/102 |
| 2011/0035294 A1* | 2/2011 | Mizrah | G06F 21/645 705/26.42 |
| 2011/0225578 A1* | 9/2011 | Lauwers | G06F 3/0484 717/176 |
| 2011/0246374 A1* | 10/2011 | Franz | G06Q 20/4012 705/77 |
| 2012/0210134 A1 | 8/2012 | Mitter | |
| 2012/0259773 A1 | 10/2012 | Hoffman | |
| 2012/0304168 A1* | 11/2012 | Raj Seeniraj | G06F 8/38 718/1 |
| 2013/0006808 A1* | 1/2013 | Kassaei | G06Q 30/06 705/26.35 |
| 2013/0133078 A1* | 5/2013 | Stefik | H04L 63/0464 726/26 |
| 2013/0138812 A1* | 5/2013 | Assuncao | G06F 9/50 709/226 |
| 2013/0204795 A1* | 8/2013 | Dinan | G06Q 20/202 705/71 |
| 2013/0311362 A1* | 11/2013 | Milam | G06Q 30/04 705/40 |
| 2014/0013321 A1* | 1/2014 | Laoutaris | G06F 9/5072 718/1 |
| 2014/0108172 A1* | 4/2014 | Weber | G06Q 30/00 705/17 |
| 2014/0129690 A1* | 5/2014 | Jaisinghani | G06F 9/5061 709/222 |
| 2014/0258155 A1* | 9/2014 | Suryanarayanan | H04L 67/1021 726/29 |
| 2014/0258450 A1* | 9/2014 | Suryanarayanan | H04L 47/70 709/217 |
| 2015/0326578 A1 | 11/2015 | Hsu et al. | |
| 2016/0012433 A1* | 1/2016 | Marenick | G06Q 20/409 705/72 |
| 2016/0092474 A1 | 3/2016 | Stojanovic et al. | |
| 2016/0117670 A1* | 4/2016 | Davis | G06Q 20/3255 705/39 |
| 2016/0224387 A1* | 8/2016 | Zhou | G06F 9/5083 |
| 2016/0247157 A1* | 8/2016 | Yang | G06Q 20/386 |
| 2016/0328522 A1* | 11/2016 | Howley | H04L 63/0861 |
| 2016/0337175 A1* | 11/2016 | Rao | H04L 41/0806 |
| 2017/0193501 A1* | 7/2017 | Cole | G06Q 20/326 |
| 2018/0107971 A1* | 4/2018 | Vukin | G06Q 10/087 |
| 2019/0311308 A1 | 10/2019 | Yang et al. | |
| 2019/0325080 A1* | 10/2019 | Natarajan | G10L 15/187 |
| 2019/0327330 A1* | 10/2019 | Natarajan | G06F 18/2411 |

FOREIGN PATENT DOCUMENTS

| | | |
|---|---|---|
| CN | 103123706 A | 5/2013 |
| CN | 104112197 A | 10/2014 |
| CN | 104239338 A | 12/2014 |
| CN | 104753907 A | 7/2015 |
| CN | 104951960 A | 9/2015 |
| CN | 105608569 A | 5/2016 |
| CN | 105719131 A | 6/2016 |
| CN | 106464742 A | 2/2017 |
| CN | 107038073 A | 8/2017 |
| CN | 107632887 A | 1/2018 |
| CN | 108268323 A | 7/2018 |
| EP | 0715247 A1 | 6/1996 |
| EP | 1355233 A1 | 10/2003 |
| JP | 2003-337916 A | 11/2003 |
| JP | 2014-167751 A | 9/2014 |
| JP | 2015-504562 A | 2/2015 |
| JP | 2016521385 A | 7/2016 |
| JP | 2016-194960 A | 11/2016 |
| JP | 6284617 B2 | 2/2018 |
| KR | 10-2012-0020701 A | 3/2012 |
| KR | 20130089777 A | 8/2013 |
| TW | 201539349 A | 10/2015 |
| TW | I517070 B | 1/2016 |
| WO | 2016007696 A1 | 1/2016 |
| WO | 2017023386 A2 | 2/2017 |

OTHER PUBLICATIONS

Written Opinion of the International Searching Authority and International Search Report for PCT Application No. PCT/CN2017/116529 dated Mar. 15, 2018 (17 pages).
International Preliminary Report on Patentability Chapter I for PCT Application No. PCT/CN2017/116529 dated Jul. 4, 2019 (14 pages).
First Search for Chinese Application No. 201611207781.7 dated May 11, 2018 (1 page).
First Office Action for Chinese Application No. 201611207781.7 dated May 25, 2018 with English machine translation (10 pages).
Supplementary Search for Chinese Application No. 201611207781.7 dated Jan. 23, 2019 (1 page).

(56) References Cited

OTHER PUBLICATIONS

Second Office Action for Chinese Application No. 201611207781.7 dated Feb. 2, 2019 (4 pages).
Third Office Action for Chinese Application No. 201611207781.7 dated Jul. 10, 2019 with English machine translation (12 pages).
Non-Final Office Action and Search Report for Taiwanese Application No. 106132576 dated Jan. 10, 2019 (6 pages).
Search Report for European Application No. 17885221.6 dated Mar. 17, 2020.
Symantec Corporation, "E-security begins with sound security policies," Jun. 14, 2001.
Fourth Office Action for Chinese Application No. 201611207781.7 dated Mar. 6, 2020.
Written Opinion for Singaporean Application No. 11201905657S dated Jul. 1, 2020.
Office Action for Korean Application No. 10-2019-7018381 dated Jul. 17, 2020.
Notice of Allowance for Korean Application No. 10-2019-7018381 dated Dec. 18, 2020.
Office Action for Japanese Application No. 2019-534248 dated Nov. 10, 2020.
Communication pursuant to Article 94(3) EPC for European Patent Application No 17885221.6 dated Oct. 17, 2023.
First Search for Chinese Application No. 202110647900.5 dated Nov. 21, 2023.

\* cited by examiner

RESOURCE PROCESSING METHOD AND APPARATUS

CROSS-REFERENCE TO RELATED APPLICATIONS

This application is a continuation application of the U.S. patent application Ser. No. 16/446,534 titled "Resource processing method and apparatus" and filed Jun. 19, 2019, which is a continuation application of International Application No. PCT/CN2017/116529 filed on Dec. 15, 2017. The International Application No. PCT/CN2017/116529 is based on and claims priority to and benefits of Chinese Patent Application No. 201611207781.7, filed with the State Intellectual Property Office (SIPO) of the People's Republic of China on Dec. 23, 2016. The entire contents of all of the above-identified applications are incorporated herein by reference.

TECHNICAL FIELD

This specification relates to the technical field of mobile communication and in particular, to a resource processing method and an apparatus thereof.

BACKGROUND

In the existing technologies, when there is a demand for resources, a resource demander can make a resource acquisition request and record the progress of the resource acquisition through a resource allocation chart. When receiving the resource acquisition request, a resource supplier can allocate a resource to the resource demander. When the resource supplier is requested to supply a resource to the resource demander and if the resource supplier has no resource available at that moment, the resource allocation is suspended. The resource allocation chart remains pending for process.

In the current technologies, the following technical problems may occur during the resource allocation process.

When the resource supplier has no resource available at the moment, the resource allocation is suspended, the resource allocation chart is pending for process, and the efficiency of resource turnover is reduced. Meanwhile, when the resource allocation chart is pending for a long time, the computer storage and computing resources can be tied up by the pending status for a long time.

Therefore, there is a need for a technical solution for resource processing to solve the technical problems of low resource turnover efficiency and high occupancy of the computer storage and computing resources during the resource allocation.

SUMMARY

Embodiments of this specification provide a technical solution for solving the problems of low resource turnover efficiency and high occupancy of the computer storage and computing resources during resource allocation.

Embodiments of this specification further provide a resource processing method and an apparatus thereof. The method comprises the following operations executed by configuring a computing device.

A resource allocation chart is generated based on a resource allocation request. The resource allocation chart is processed and an access entrance of the resource allocation chart is generated. The access entrance is opened to enable at least one third party resource supplier to respond to the resource allocation request by means of the access entrance.

The embodiments of this application further provide a resource processing apparatus including: a requesting module configured to generate a resource allocation chart based on a resource allocation request; a processing module configured to process the resource allocation chart and generate an access entrance of the resource allocation chart; and a posting module configured to open the access entrance to enable a third party resource supplier to respond to the resource allocation request via the access entrance.

A resource processing apparatus. The resource processing apparatus includes one or more processors and a memory configured to store instructions which, when executed by the one or more processors, cause the one or more processors to perform operations including: generating a resource allocation chart based on a resource allocation request; processing the resource allocation chart and generating an access entrance of the resource allocation chart; and opening the access entrance to enable at least one third party resource supplier to respond to the resource allocation request via the access entrance.

The resource processing method and apparatus thereof provided by the embodiments of this specification have at least the following benefits.

The resource allocation chart generated based on the resource allocation request can be processed to generate the access entrance. When there is a shortage in local resources or the local resources are not suitable for allocation, a third party resource supplier can respond to the resource allocation request through the access entrance and perform an resource allocation operation, thereby improving the turnover efficiency of resources. In addition, the corresponding resource allocation chart can be processed promptly, so that the occupancy on computer storage and computing resources can be reduced.

BRIEF DESCRIPTION OF THE DRAWINGS

The drawings set forth herein are a part of this specification and used for providing a further understanding of this application. Exemplary embodiments of this specification and the description thereof are used for explaining this application, but does not constitute any limitation on this specification. In the enclosed drawings.

DETAILED DESCRIPTION

To clearly state the objectives, technical solutions, and advantages of this specification, the technical solutions of this specification will be described according to the embodiments of this specification and the corresponding drawings. The embodiments described herein are only a portion of all the embodiments of this specification. Based on this specification, other embodiments obtained by a person of ordinary skill in the art shall fall within the protection scope of this specification.

Figure 1:
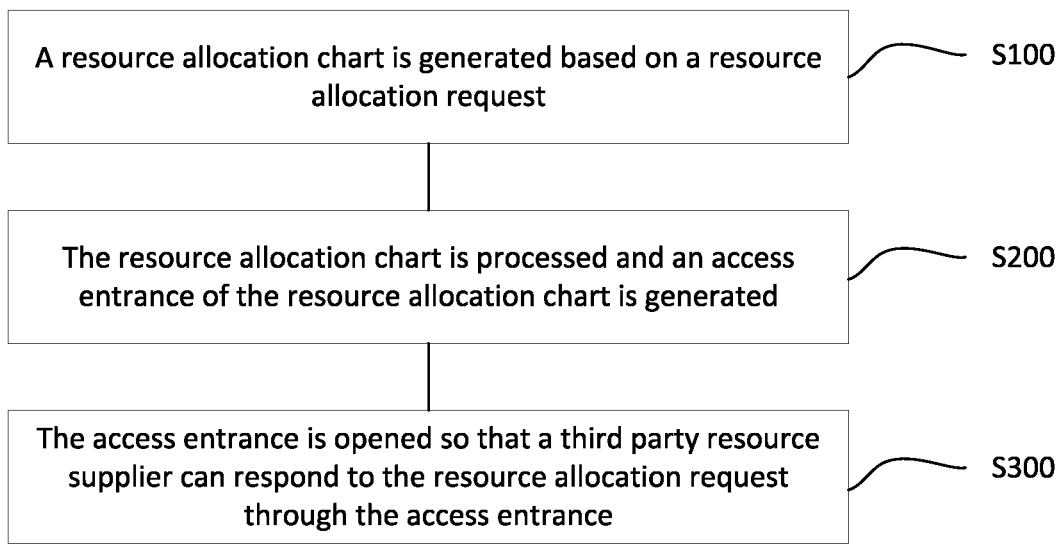
FIG. 1 is a flow chart of a resource processing method according to one example embodiment.

FIG. 1 is a flow chart illustrating a resource processing method according to one example embodiment. The method is implemented by a computing device configured to execute the following operations.

At S100, a resource allocation chart is generated based on a resource allocation request.

In the embodiments of this specification, the resources may include manufacturer supplies, consumer products, or the allocation rights thereof. For easy understanding, the embodiments of this specification may include, but not limited to, allocation of funds as examples. Correspondingly, the resource allocation chart may include a bill. Generating a resource allocation chart may include generating a resource allocation chart by a local computing device, or receiving a resource allocation chart that is generated by an external application server, such as receiving a payment document generated by a server based on a payment request.

At S200, the resource allocation chart is processed and an access entrance of the resource allocation chart is generated.

In the embodiments of this specification, the information in a resource allocation chart can be static. The resource allocation chart usually has various detailed information of a resource allocation requester. On the one hand, the information of the resource allocation requester needs to be kept confidential. On the other hand, the resource allocation chart needs to be accessed by other users. Thus, processing the resource allocation chart may include disclosing part of the information to other users.

Further, in some embodiments, the processing resource allocation chart and generating the access entrance of the resource allocation chart may include encoding the resource allocation chart to generate a shared code.

Based on the requirement that the resource allocation chart can be accessed by other users, a virtual address of the resource allocation chart in the server can be encoded and converted into a shared code, which can be accessed by the other users. For example, the virtual address of the resource allocation chart in the server can be encoded as a password or as a two-dimensional code.

At S300, the access entrance is opened so that a third party resource supplier can respond to the resource allocation request through the access entrance.

The resource allocation requester can open the resource allocation chart to the third party resource supplier by sharing the resource allocation chart. The third party resource supplier can respond to the resource allocation request through the access entrance. For example, the resource allocation requester can forward the shared code to the third party resource supplier or post the shared code on a platform. The third party resource supplier can access the resource allocation chart through a forwarded link or through the shared code posted on the platform, and respond to the resource allocation request.

Further, in some embodiments of this specification, opening the access entrance may include: configuring an access condition; and when the access condition is satisfied, opening the access entrance.

To control accessibility to and security of the resource allocation chart, access conditions can be configured for accessing the access entrance. When an access behavior meets the access conditions, the access entrance is opened. When an access behavior does not meet the access conditions, the access entrance is closed.

Further, in some embodiments, the access conditions may be configured by determining a maximum number of the third party resource suppliers that can be accepted by the access entrance; and configuring the access conditions as that a number of accesses does not exceed the determined maximum number.

The upper limit or maximum number of the third party resource suppliers that the access entrance can accept can be set. In the same day or within a period of time, when the number of accesses to the resource allocation chart by the third party resource suppliers through the access entrance reaches the upper limit or maximum number, the access entrance is closed. When the number of accesses does not reach the upper limit or maximum number, the access entrance remains open. The upper limit or maximum number can be set according to actual needs. Specifically, it can be a restriction on the number of accesses of a single third party resource supplier through the access entrance, a restriction on the total number of accesses of all the third party resource suppliers through the access entrance, or a restriction on the number of the third party resource suppliers.

Further, in one embodiment, configuring the access conditions may include: determining an opening period of the access entrance; and configuring the access conditions as an access time within the determined opening period.

The access time of the access entrance can be set to prevent overdue accesses, to ensure securely sharing the resource allocation chart. The access entrance is open for the third party resource supplier to access the resource allocation chart within the determined opening period. When the third party resource supplier accesses the resource allocation chart beyond the opening period, the access entrance is closed.

In the embodiments of this specification, the resource allocation chart based on the resource allocation request can be processed to generate the access entrance. When there is a shortage in local resources or the local resources are not suitable for allocation, the third party resource supplier can respond to the resource allocation request through the access entrance and perform a resource allocation operation, thereby improving the turnover efficiency of resources. In addition, the corresponding resource allocation chart can be processed promptly, so that the occupancy of the computer storage and computing resources are reduced.

Further, in some embodiments of this specification, the method further includes encrypting the resource allocation chart and generating an encrypted resource allocation chart.

To keep information of the resource allocation requester confidential, the server can encrypt the resource allocation chart. For example, the private information about the resource allocation requester, such as account information involved in the resource allocation chart, is encrypted. When other users access the resource allocation chart through the shared code, the other users can only see the disclosed information in accordance with an agreement between the resource allocation requester and the server.

Further, in some embodiments, the generating the encrypted resource allocation chart may include: generating a chart number of the encrypted resource allocation chart.

To keep the information of the resource allocation requester confidential, the server can encrypt the original resource allocation chart and generate the chart number for the encrypted resource allocation chart. Thus, through a mapping between a chart number of the original resource allocation chart and the generated chart number of the encrypted resource allocation chart, other users can access the resource allocation chart through the shared code to obtain the disclosed information in accordance with the agreement between the resource allocation requester and the server. However, the other users cannot reversely derive a resource allocation record of the resource allocation requester through the generated chart number of the encrypted resource allocation chart by reverse engineering.

Further, in some embodiments, opening the access entrance may further include granting a permission for the third party resource supplier to access to the access entrance; and blocking a permission for the third party resource supplier to open the access entrance.

To keep the information of the resource allocation requester confidential and secure to prevent unlimited sharing of the resource allocation chart, in some embodiments, the permission to access to the access entrance is granted to the third party resource supplier, but the permission to open the access entrance is blocked to the third party resource supplier. In other words, the access entrance can only be shared at a first level from a local user to the third party resource supplier, while the third party resource supplier is prevented from spreading the access entrance to other parties at a second level by forwarding or sharing.

Further, in some embodiments, the method further includes determining a processing state of the resource allocation chart when the third party resource supplier passes through the access entrance; and providing a mode for responding to the resource allocation request according to the processing state of the resource allocation chart, so that the third party resource supplier can respond to the resource allocation request according to the mode.

In embodiments of this specification, a mode for the third party resource supplier to respond to resource allocation can be provided according to the processing state of the resource allocation chart. When there is a shortage in local (requester's) resources, resources can be supplied by the third party resource supplier. However, when the local resources are sufficient, the local resources can be allocated based on the resource allocation request. Then the local resources can be compensated by the third party resource supplier, so that the local resources are sufficient to satisfy the resource allocation request locally as much as possible, thereby improving the turnover efficiency of resources and reducing the occupancy on the computer storage and computing resources during processing of the resource allocation chart.

Figure 2:
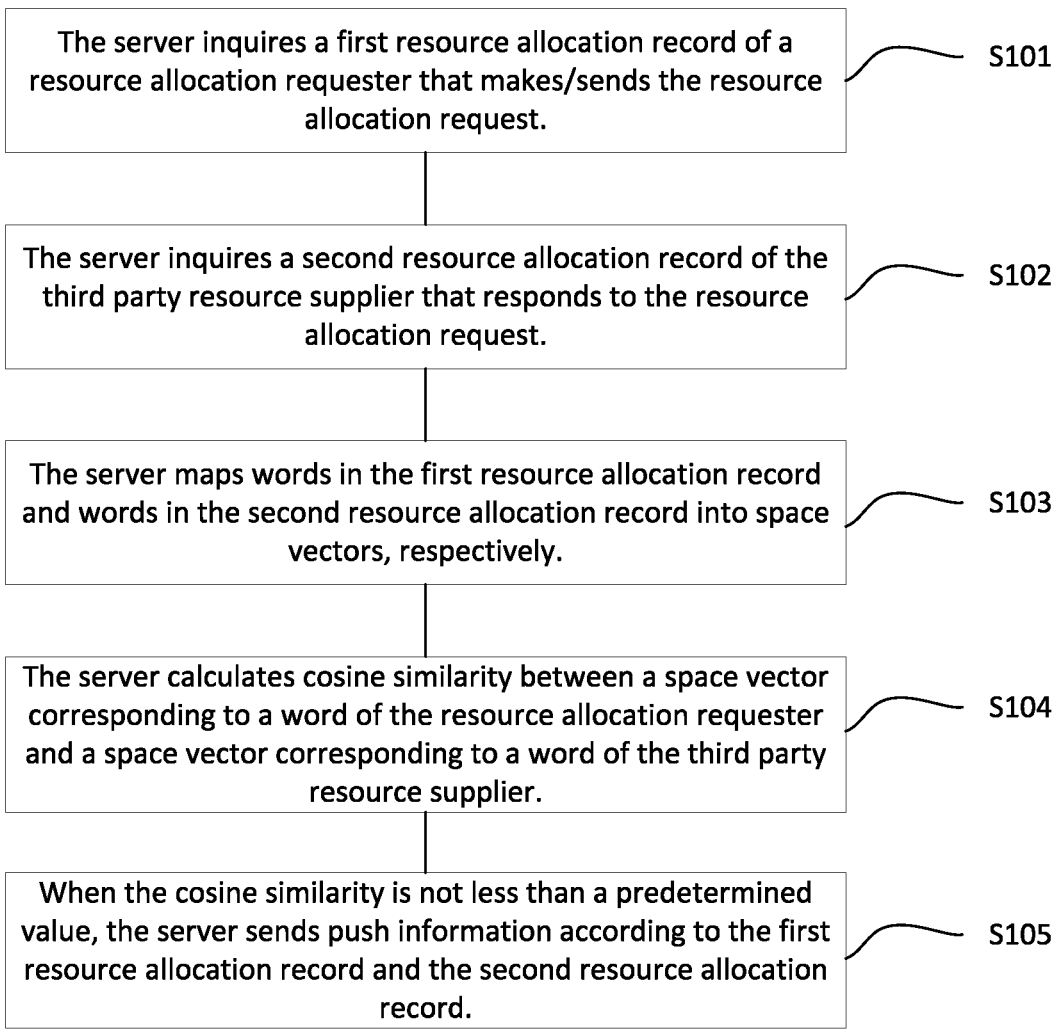
FIG. 2 is a flow chart of a method for processing resource allocation requests according to one example embodiment.

Referring to FIG. 2, in some embodiments, the method further includes the following operations.

At S101, the server inquires a first resource allocation record of a resource allocation requester that makes/sends the resource allocation request.

At S102, the server inquires a second resource allocation record of the third party resource supplier that responds to the resource allocation request.

At S103, the server maps words in the first resource allocation record and words in the second resource allocation record into space vectors, respectively.

At S104, the server calculates cosine similarity between a space vector corresponding to a word of the resource allocation requester and a space vector corresponding to a word of the third party resource supplier.

At S105, when the cosine similarity is not less than a predetermined value, the server sends push information according to the first resource allocation record and the second resource allocation record.

The embodiments of this specification further provide a technical solution for data mining and application. A server can inquire the resource allocation record of the resource allocation requester that makes the resource allocation request, and save the resource allocation record as the first resource allocation record. For example, when the resource allocation request is a payment request and the resource allocation chart is a payment document, the payment document usually includes transaction details, such as commodity code, price, and date. The server takes a payment record within a period of time as the first resource allocation record. Similarly, the server can inquire and save a payment record of the third party resource supplier within a period of time as the second resource allocation record. Then the server can process and map words in the first resource allocation record and the second resource allocation record into the space vectors, respectively. Particularly, the words can be mapped as real value vectors using a word embedding model Word2Vec. The word embedding model Word2Vec has been disclosed in the existing technologies, and will not be described in details here. Through a large-scale semantic training, processing words can be simplified to vector operations in a multi-dimensional vector space. Further, the similarity between the resource allocation requester and the third party resource supplier can be characterized by calculating similarity between the space vectors corresponding to the words of the resource allocation requester and the space vectors corresponding to the words of third party resource supplier. In embodiments of this specification, the cosine similarity between a space vector corresponding to the resource allocation requester and a space vector corresponding to the third party resource supplier can be calculated. When the calculated cosine similarity is not less than a predetermined value, it indicates that a behavior of the resource allocation requester and a behavior of the third party resource supplier are similar. Then, the push information is sent out according to the first resource allocation record and the second resource allocation record. The server can compare the first resource allocation record and the second resource allocation record. In this example, the server can compare the commodities involved in the payment documents, and push to the third party resource supplier the commodity information in the payment document of the resource allocation requester but not in the payment document of the third party resource supplier. Similarly, the server can push to the resource allocation requester commodity information in the payment document of the third party resource supplier but not in the payment document of the resource allocation requester.

Figure 3:
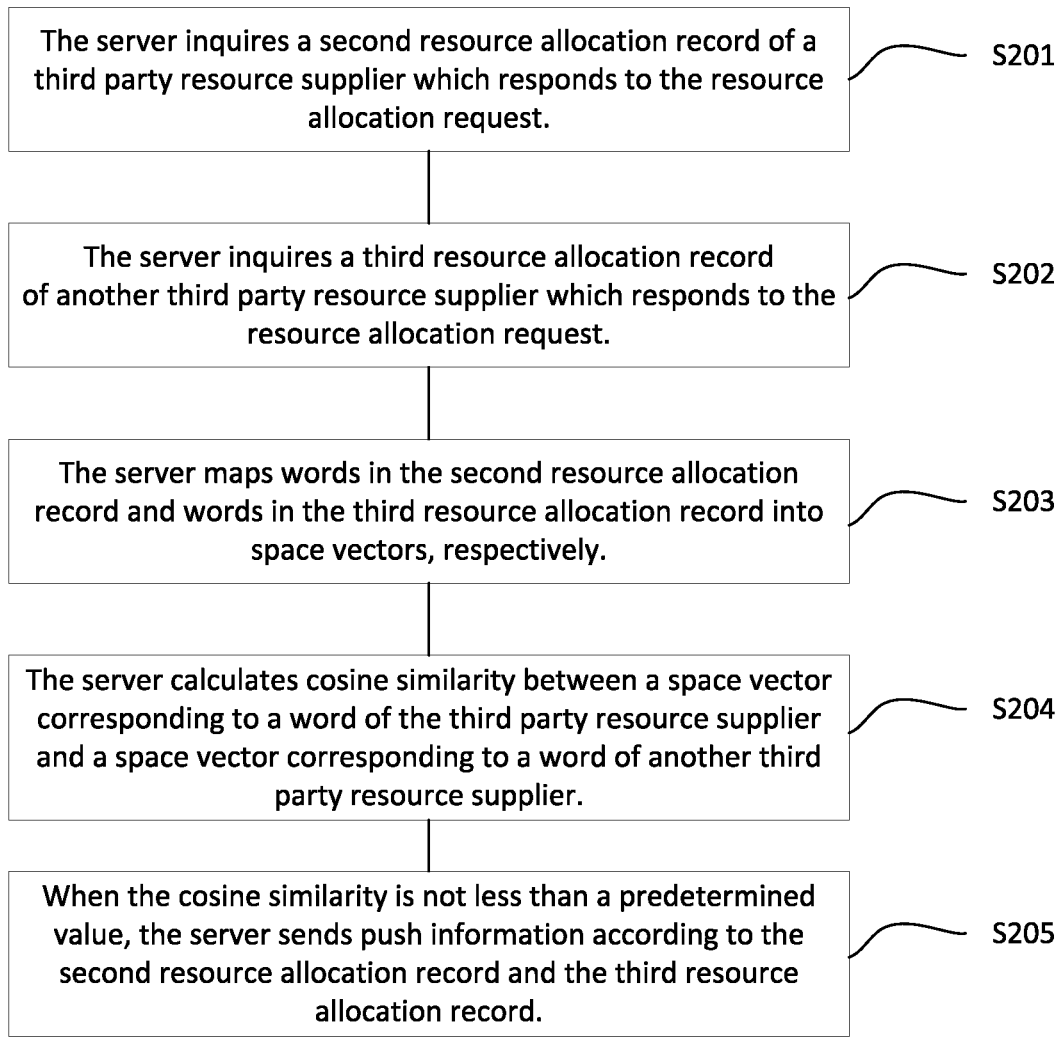
FIG. 3 is a flow chart of a method for processing resource allocation requests according to one example embodiment.

Referring to FIG. 3, in some embodiments, the method further includes the following operations.

At S201, the server inquires a second resource allocation record of a third party resource supplier which responds to the resource allocation request.

At S202, the server inquires a third resource allocation record of another third party resource supplier which responds to the resource allocation request.

At S203, the server maps words in the second resource allocation record and words in the third resource allocation record into space vectors, respectively.

At S204, the server calculates cosine similarity between a space vector corresponding to a word of the third party resource supplier and a space vector corresponding to a word of another third party resource supplier.

At S205, when the cosine similarity is not less than a predetermined value, the server sends push information according to the second resource allocation record and the third resource allocation record.

Different from the previous embodiment, the cosine similarity between the space vectors corresponding to the two respective third party resource suppliers is calculated. Details are described as follows.

The server can inquire the resource allocation record within a period of time of one third party resource supplier as the second resource allocation record. The server can inquire the resource allocation record supplier within the period of time of another third party resource as the third resource allocation record. For example, when the resource allocation request is a payment request and the resource allocation chart is a payment document, the payment document usually involves transaction details, such as commodity code, price, and date. The server can use a word embedding model Word2Vec to map the words as real value vectors. Then the cosine similarity between the space vectors corresponding to the two respective third party resource suppliers can be calculated. When the calculated cosine similarity is not less than the predetermined value, it indicates that the behaviors of the two third party resource suppliers are similar. Then, the push information is sent out according to the second resource allocation record and the third resource allocation record. The server can compare the second resource allocation record and the third resource allocation record. For example, the server compares the commodities involved in the payment documents, and pushes to another third party resource supplier commodity information not in the payment document of a third party resource supplier. In general, "another third party resource supplier" herein can be characterized as a top N friends of the resource allocation requester.

An application scenario of the embodiments of this specification is described as following.

A local computing device, such as a personal computer terminal device or a mobile terminal device, generates a payment document based on a payment request according to a transaction record. Alternatively, the local computing device receives a payment document sent by an application server based on a payment request. The local computing device can process the payment document and generate a shared code such as two-dimensional code or password as an access entrance for the payment document. Alternatively, the application server can also process the payment document. The local computing device can synchronize the information with the application server. The local computing device can forward the access entrance to a third party resource supplier or post the access entrance to a platform. For example, the local computing device can forward it to friends or post it to the platform for the requester's friends to see. Friends who receive the forwarded link to the access entrance or see the posted access entrance on the platform can respond to the payment request. When the payment document is shown as in an unpaid status, funds can be raised responding to the payment request. When the payment document is shown as in a paid status, funds can be released as a reward responding to the payment request. In this way, the technical problems of low fund turnover efficiency and high occupancy on computer storage and computing resources during fund allocation can be solved. Further, the application server can inquire a payment record of a payment requester. The application server can inquire a payment record of a fund requester or fund provider. The application server can use a word embedding model Word2Vec to process and map the payment records of the payment requester, the fund requester, or the fund provider, into space vectors, respectively. The application server can calculate the cosine similarity between a space vector corresponding to the payment requester and a space vector corresponding to the fund requester or the fund provider. When the cosine similarity is not less than a predetermined value, the application server pushes missing commodity information to the payment requester. Alternatively, the application server can push/send missing commodity information to the fund requester or the fund provider. The application server can further calculate the cosine similarity between the space vectors corresponding to a respective fund requester or fund provider. When the cosine similarity is not less than the predetermined value, the application server pushes missing commodity information to the fund requester or the fund provider. The missing commodity information can be obtained by comparing the payment documents.

Figure 4:
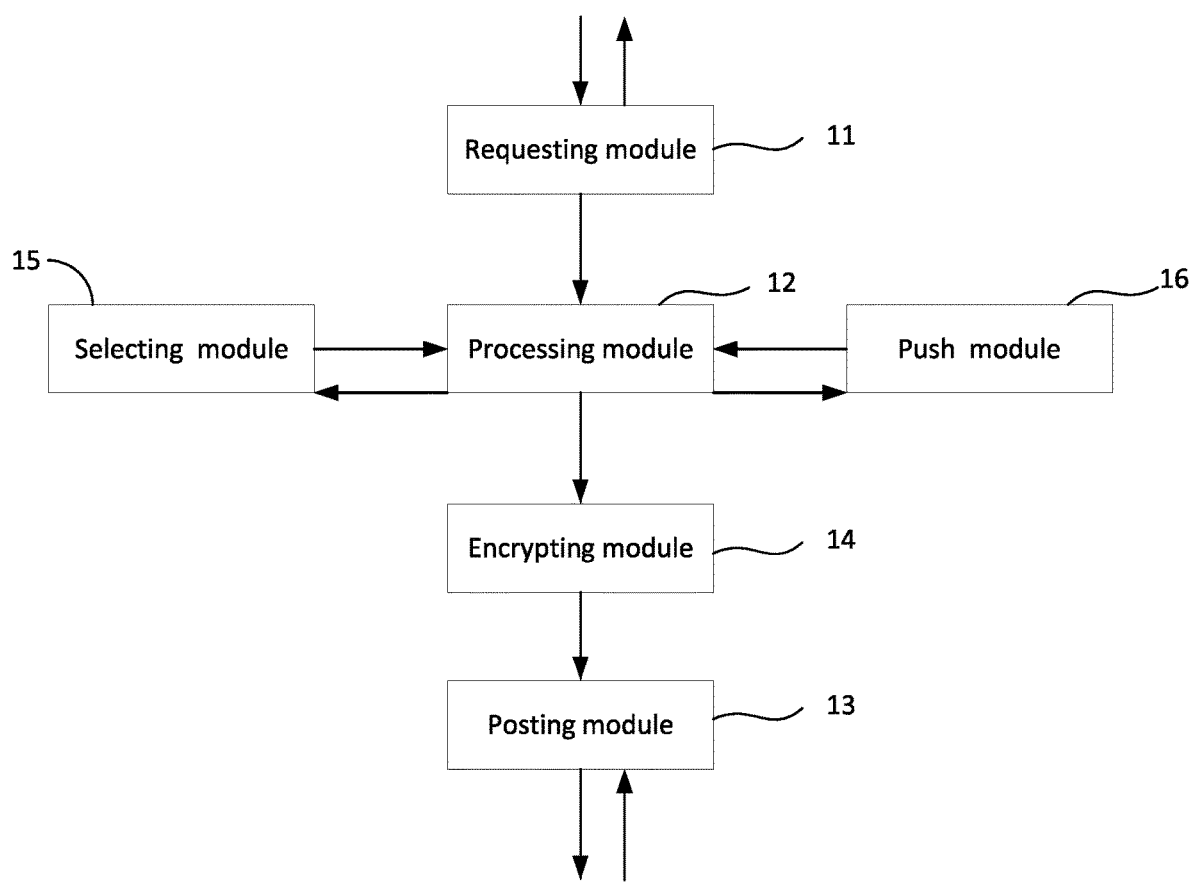
FIG. 4 is a block diagram of a resource processing apparatus according to one example embodiment.

The above resource processing methods are illustrated by the embodiments of this specification. Based on the same principle and referring to FIG. 4, this specification further provides a resource processing apparatus including a requesting module 11, a processing module 12, and a posting module 13.

The requesting module 11 is configured to generate a resource allocation chart based on a resource allocation request.

The processing module 12 is configured to process the resource allocation chart and generate an access entrance of the resource allocation chart.

The posting module 13 is configured to open the access entrance, so that a third party resource supplier can respond to the resource allocation request through the access entrance.

In embodiments of this specification, a mode can be provided for the third party resource supplier to respond to resource allocation according to a processing state of the resource allocation chart. When there is a shortage in local resources, resources can be supplied by the third party resource supplier. However, when the local resources are sufficient and after the local resources are allocated to satisfy the request, the local resources can be replenished by the third party resource supplier, so that the local resources are sufficient to respond to the resource allocation request as much as possible, thereby improving the turnover efficiency of resources and reducing the occupancy on the computer storage and computing resources during processing of the resource allocation chart.

Further, in some embodiments of this specification, the processing module 12 is configured to encode the resource allocation chart to generate a shared code.

Based on the requirement that the resource allocation chart can be accessed by other users, a virtual address of the resource allocation chart in the server is encoded and converted into a shared code which can be accessed by other users. For example, the virtual address of the resource allocation chart in the server can be encoded as a password or as a two-dimensional code.

Further, in some embodiments of this specification, the apparatus further includes an encrypting module 14 configured to encrypt the resource allocation chart and generate an encrypted resource allocation chart.

To keep information of the resource allocation requester confidential, the server can encrypt the resource allocation chart. For example, the private information about the resource allocation requester, such as account information involved in the resource allocation chart, is encrypted. When other users access the resource allocation chart through the shared code, the other users can only see the disclosed information in accordance with an agreement between the resource allocation requester and the server.

Further, in some embodiments of this specification, the encrypting module 14 is further configured to generate a chart number of the encrypted resource allocation chart.

To keep the information of the resource allocation requester confidential, the server can encrypt the original resource allocation chart and generate the chart number of the encrypted resource allocation chart. Thus, through a mapping between a chart number of the original resource allocation chart and the generated chart number of the encrypted resource allocation chart, other users can access the resource allocation chart through the shared code to obtain the disclosed information in accordance with the agreement between the resource allocation requester and the server. However, the other users cannot reversely derivate a resource allocation record of the resource allocation requester through the generated chart number of the encrypted resource allocation chart.

Further, in some embodiments of this specification, the posting module 13 is configured to: grant a permission for the third party resource supplier to access to the access entrance, and block a permission for the third party resource supplier to open the access entrance to others.

To keep the information of the resource allocation requester confidential and to prevent the unlimited spread of the resource allocation chart, a permission for the third party resource supplier to access to the access entrance is granted, but a permission for the third party resource supplier to open the access entrance to others is blocked. In other words, the access entrance can only be propagated at a first level from a local user to the third party resource supplier, while the third party resource supplier is prevented from spreading the access entrance to other parties at a second level by forwarding or sharing.

Further, in some embodiments of this specification, the posting module 13 is configured to configure an access condition, and when the access condition is satisfied, open the access entrance.

To control a number of accesses to the resource allocation chart and the security of the resource allocation chart, the access condition of the access entrance can be configured. When an access behavior meets the access condition, the access entrance is open, and when an access behavior does not meet the access condition, the access entrance is closed.

Further, in some embodiments of this specification, the posting module 13 is configured to determine a maximum number of the third party resource suppliers that the access entrance can accept, and configure the access condition as that the number of accesses does not exceed the determined maximum number.

The upper limit or the maximum number of the third party resource suppliers accepted by the access entrance can be set. In the same day or within a period of time, when the number of accesses by the third party resource suppliers to the resource allocation chart through the access entrance reaches the upper limit or the maximum number, the access entrance is closed. When the number of accesses does not reach the upper limit or the maximum number, the access entrance is open. The upper limit or the maximum number herein can be set according to actual needs. Specifically, it can be a restriction on the number of accesses of a single third party resource supplier through the access entrance, a restriction on the total number of accesses of all the third party resource suppliers through the access entrance, or a restriction on the number of the third party resource suppliers.

Further, in one embodiment, the posting module 13 is configured to determine an opening period of the access entrance, and configure the access condition as that an access time is within the determined opening period.

The access time of the access entrance can be set so that overdue access can be prevented, thus securely sharing the resource allocation chart. When the third party resource supplier accesses the resource allocation chart within the determined opening period, the access entrance is open. When the third party resource supplier accesses the resource allocation chart beyond the opening period, the access entrance is closed.

Further, in one embodiment, the apparatus further includes a selecting module 15 configured to determine a processing state of the resource allocation chart when the third party resource supplier passes through the access entrance; and provide a mode for responding to the resource allocation request according to the processing state of the resource allocation chart, so that the third party resource supplier responds to the resource allocation request according to the mode.

In embodiments of this specification, a mode can be provided for the third party resource supplier to respond to resource allocation according to a processing state of the resource allocation chart. When there is a shortage in local resources, resources can be supplied by the third party resource supplier. However, when the local resources are sufficient and after the local resources are allocated to satisfy the request, the local resources can be replenished by the third party resource supplier, so that the local resources are sufficient for responding to the resource allocation request locally as much as possible, thereby improving the turnover efficiency of resources and reducing the occupancy on the computer storage and computing resources during processing of the resource allocation chart.

Further, in one embodiment provided by this specification, the apparatus further includes a push module 16 configured to inquire a first resource allocation record of a resource allocation requester that makes the resource allocation request; inquire a second resource allocation record of the third party resource supplier which responds to the resource allocation request; map words in the first resource allocation record and words in the second resource allocation record into space vectors, respectively; calculate cosine similarity between a space vector corresponding to a word of the resource allocation requester and a space vector corresponding to a word of the third party resource supplier; and when the cosine similarity is not less than a predetermined value, send push information according to the first resource allocation record and the second resource allocation record.

In the embodiments of this specification, a technical solution for data mining and application is further provided. The server can inquire the resource allocation record of the resource allocation requester that makes the resource allocation request, and take the resource allocation record as the first resource allocation record. For example, when the resource allocation request is a payment request and the resource allocation chart is a payment document, the payment document usually involves transaction details, such as commodity code, price, and date. The server takes a payment record within a period of time as the first resource allocation record. Similarly, the server takes a payment record within a period of time of the third party resource supplier as the second resource allocation record. Then the server can process and map words in the first resource allocation record and the second resource allocation record into the space vectors, respectively. Particularly, the words can be mapped as real value vectors using a word embedding model Word2Vec. The word embedding model Word2Vec has been disclosed in the existing technologies, and will not be described in details here. Through a large scale semantic training, processing words is simplified to vector operations in a multi-dimensional vector space. Further, the similarity between the resource allocation requester and the third party resource supplier can be characterized by calculating the similarity of the space vectors corresponding to the words of the resource allocation requester and the space vectors corresponding to the words of the third party resource supplier. In embodiments of this specification, the cosine similarity between a space vector corresponding to the resource allocation requester and a space vector corresponding to the third party resource supplier can be calculated. When the calculated cosine similarity is not less than the predetermined value, it indicates that a behavior of the resource allocation requester and a behavior of the third party resource supplier are similar. Then, the push information is sent out according to the first resource allocation record and the second resource allocation record. For example, the server can compare the first resource allocation record and the second resource allocation record. In this example, the server can compare the commodities involved in the payment document, and push/send to the third party resource supplier commodity information in the payment document of the resource allocation requester but not in the payment document of the third party resource supplier. Similarly, the server can push to the resource allocation requester commodity information existing in the payment document of the third party resource supplier but missing in the payment document of the resource allocation requester.

Further, in some embodiments of this specification, the apparatus further includes a push module 16 configured to inquire a second resource allocation record of one third party resource supplier which responds to the resource allocation request; inquire a third resource allocation record of another third party resource supplier which responds to the resource allocation request; map the words in the second resource allocation record and the words in the third resource allocation record into space vectors, respectively; calculate cosine similarity between the space vector corresponding to a word of the one third party resource supplier and the space vector corresponding to a word of another third party resource supplier; and when the cosine similarity is not less than a predetermined value, send push information according to the second resource allocation record and the third resource allocation record.

Different from the previous embodiment, the cosine similarity between the space vectors corresponding to the two respective third party resource suppliers is calculated. Details are described as follows.

The server can inquire the resource allocation record within a period of time of one third party resource supplier as the second resource allocation record. The server can inquire the resource allocation record within a period of time of another third party resource supplier as the third resource allocation record. For example, when the resource allocation request is a payment request and the resource allocation chart is a payment document, the payment document usually includes transaction details, such as commodity code, price, and date. The server can use a word embedding model Word2Vec to map the words as real value vectors. Then the cosine similarity between the space vectors corresponding to the two respective third party resource suppliers can be calculated. When the calculated cosine similarity is not less than the predetermined value, it indicates that the behaviors of the two third party resource suppliers are similar. Then, the push information is sent out according to the second resource allocation record and the third resource allocation record. The server can compare the second resource allocation record and the third resource allocation record. For example, the server compares the commodities involved in the payment documents, and push to the third party resource supplier commodity information not in the payment document of the third party resource supplier. In general, "another third party resource supplier" herein can be characterized as a top N friends of the resource allocation requester.

Further, in some embodiments of this specification, the resource allocation chart includes a bill.

In the embodiments provided by this specification, the resource allocation chart based on the resource allocation request is processed to generate the access entrance. When there is a shortage in local resources or the local resources are not suitable to allocate resources, the third party resource supplier can respond to the resource allocation request through the access entrance and perform an resource allocating operation, thereby improving the turnover efficiency of resources. In addition, the corresponding resource allocation chart is processed promptly, so that the occupancy on the computer storage and computing resources are reduced.

A person skilled in the art should understand that the embodiments of the present specification may be provided as a method, a system, or a computer program product. Therefore, the embodiments of the present specification may comprise hardware, software, or a combination of software and hardware. Moreover, the embodiments of the present specification may comprise a computer program product stored on one or more computer-usable storage media (including but not limited to a disk memory, a CD-ROM, an optical memory, and the like) that include computer-usable program code.

The present specification is described in accordance with the flowcharts and/or block diagrams of the method, the device (system), and the computer program product according to the embodiments of the present specification. It should be understood that computer program instructions may be used for implementing each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a machine including a processor of any other programmable data processing device, so that the instructions executed by a computer or a processor of any other programmable data processing device can create an apparatus for implementing a specific function in one or more processes in the flowcharts and/or in one or more blocks in the block diagrams.

These computer program instructions may also be stored in a computer readable memory that can configure a computer or another programmable data processing device to work in a specific manner, so that the instructions stored in the computer readable memory can generate a product including an instruction apparatus, wherein the instruction apparatus implements functions specified in one or more processes in the flowcharts and/or one or more blocks in the block diagrams.

These computer program instructions may also be loaded in a computer or another programmable data processing device, so that a series of operations are performed on the computer or another programmable data processing device to generate process implemented by a computer, and instructions executed on the computer or another programmable data processing device can provide operations for implementing functions specified in one or more processes in the flowcharts and/or one or more blocks in the block diagrams.

In a typical configuration, the computing device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not explicitly listed, or include the inherent elements of the process, method, article and device. Without further limitation, the element defined by a phrase "include one . . . " does not exclude other same elements in the process, method, article or device which include the element.

A person skilled in the art should understand that the embodiments of this specification may be provided as a method, a system, or a computer program product. Therefore, this specification may use hardware only embodiments, software only embodiments, or embodiments with a combination of software and hardware. Moreover, the embodiments of this specification may use a computer program product that is implemented on one or more computer-usable storage media (including but not limited to a disk memory, a CD-ROM, an optical memory, and the like) that include computer-usable program code.

The foregoing descriptions are merely embodiments of this specification and are not intended to limit this specification. For a person skilled in the art, various modifications and variations can be made based on this specification. Any modification, equivalent replacement, or improvement made without departing from the spirit and principle of this specification shall fall within the scope of the claims of this specification.

What is claimed is:

1. A resource processing method, comprising:
   generating a resource allocation chart based on a resource allocation request;
   generating an access entrance of the resource allocation chart;
   opening the access entrance for a plurality of resource suppliers to respond to the resource allocation request via the access entrance;
   mapping words in resource allocation records from a pair of resource suppliers in the plurality of resource suppliers into a pair of space vectors;
   calculating a cosine similarity between the pair of space vectors; and
   when the cosine similarity is not less than a threshold value, sending push information of the resource allocation request to one of the pair of resource suppliers according to the resource allocation records.

2. The method of claim 1, further comprising:
   inquiring a first resource allocation record of a resource allocation requestor of the resource allocation request;
   inquiring a second resource allocation record of a resource supplier of the plurality of resource suppliers;
   mapping a word in the first resource allocation record and a word in the second resource allocation record into space vectors, respectively;
   calculating a similarity between a space vector corresponding to the word of the first resource supplier and a space vector corresponding to the word of the second resource supplier; and
   when the similarity is not less than a threshold value, sending push information according to the first resource allocation record and the second resource allocation record.

3. The method of claim 1, wherein generating the access entrance of the resource allocation chart comprises:
   encoding a virtual address of the resource allocation chart to generate a shared code as the access entrance.

4. The method of claim 3, wherein encoding the virtual address of the resource allocation chart comprises:
   encrypting the resource allocation chart;
   generating a chart number of the encrypted resource allocation chart; and
   mapping a chart number of the resource allocation chart to the chart number of the encrypted resource allocation chart.

5. The method of claim 1, wherein opening the access entrance comprises:
   granting a permission for the plurality of resource suppliers to access the access entrance.

6. The method of claim 1, wherein opening the access entrance comprises:
   configuring an access condition; and
   when the access condition is satisfied, opening the access entrance, wherein the access condition is that a number of times of access by each resource supplier is no more than a threshold and that an access time is within an opening time period.

7. The method of claim 1, further comprising:
   determining a processing state of the resource allocation chart when one of the plurality of resource suppliers passes through the access entrance, wherein the processing state is local resources being in shortage or being sufficient; and
   providing a mode for responding to the resource allocation request according to the processing state of the resource allocation chart for the one resource supplier to respond to the resource allocation request according to the mode, wherein when the processing state is the local resources being in shortage, the mode corresponding to the processing state is supplying the local resources from one or more of the plurality of resource suppliers.

8. The method of claim 7, further comprising, when the processing state is the local resources being sufficient, replenishing the local resources from at least one of the plurality of resource suppliers after the resource allocation request is satisfied.

9. A non-transitory computer-readable storage medium storing instructions which, when executed by a processor, to cause the processor to perform operations comprising:
  generating a resource allocation chart based on a resource allocation request;
  generating an access entrance of the resource allocation chart by encoding a virtual address of the resource allocation chart to generate a shared code as the access entrance;
  opening the access entrance for a plurality of resource suppliers to respond to the resource allocation request via the access entrance;
  mapping words in resource allocation records from a pair of resource suppliers in the plurality of resource suppliers into a pair of space vectors;
  calculating a cosine similarity between the pair of space vectors; and
  when the cosine similarity is not less than a threshold value, sending push information of the resource allocation request to one of the pair of resource suppliers according to the resource allocation records.

10. The non-transitory computer-readable storage medium of claim 9, wherein the operations further comprise:
  inquiring a first resource allocation record of a resource allocation requestor of the resource allocation request;
  inquiring a second resource allocation record of a resource supplier of the plurality of resource suppliers;
  mapping a word in the first resource allocation record and a word in the second resource allocation record into space vectors, respectively;
  calculating a similarity between a space vector corresponding to the word of the first resource supplier and a space vector corresponding to the word of the second resource supplier; and
  when the similarity is not less than a threshold value, sending push information according to the first resource allocation record and the second resource allocation record.

11. The non-transitory computer-readable storage medium of claim 9, wherein encoding the virtual address of the resource allocation chart comprises:
  encrypting the resource allocation chart;
  generating a chart number of the encrypted resource allocation chart; and
  mapping a chart number of the resource allocation chart to the chart number of the encrypted resource allocation chart.

12. The non-transitory computer-readable storage medium of claim 9, wherein opening the access entrance comprises:
  granting a permission for the plurality of resource suppliers to access the access entrance.

13. The non-transitory computer-readable storage medium of claim 9, wherein opening the access entrance comprises:
  configuring an access condition; and
  when the access condition is satisfied, opening the access entrance, wherein the access condition is that a number of times of access by each resource supplier is no more than a threshold and that an access time is within an opening time period.

14. The non-transitory computer-readable storage medium of claim 9, wherein the operations further comprise:
  determining a processing state of the resource allocation chart when one of the plurality of resource suppliers passes through the access entrance, wherein the processing state is local resources being in shortage or being sufficient; and
  providing a mode for responding to the resource allocation request according to the processing state of the resource allocation chart for the one resource supplier to respond to the resource allocation request according to the mode, wherein when the processing state is the local resources being in shortage, the mode corresponding to the processing state is supplying the local resources from one or more of the plurality of resource suppliers.

15. The non-transitory computer-readable storage medium of claim 14, wherein the operations further comprise when the processing state is the local resources being sufficient, replenishing the local resources from at least one of the plurality of resource suppliers after the resource allocation request is satisfied.

16. An apparatus, comprising:
  one or more processors; and
  a memory configured to store instructions which, when executed by the one or more processors, cause the one or more processors to perform operations comprising:
    generating a resource allocation chart based on a resource allocation request;
    generating an access entrance of the resource allocation chart;
    opening the access entrance for a plurality of resource suppliers to respond to the resource allocation request via the access entrance;
    mapping words in resource allocation records from a pair of resource suppliers in the plurality of resource suppliers into a pair of space vectors;
    calculating a cosine similarity between the pair of space vectors; and
    when the cosine similarity is not less than a threshold value, sending push information of the resource allocation request to one of the pair of resource suppliers according to the resource allocation records.

* * * * *